Patented Dec. 3, 1946

2,411,925

UNITED STATES PATENT OFFICE 2,411,925

PROCESS FOR REFINING OLEORESIN

Ray V. Lawrence, Lake City, Fla., assignor to Claude R. Wickard, as Secretary of Agriculture of the United States of America and to his successors in office No Drawing. Application September 23, 1941, Serial No. 412,004

4 Claims. (Cl. 260—109)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a process for the refining of crude pine oleoresin, commonly known as turpentine gum, from which an improved grade of rosin may be made.

Crude oleoresin is usually contaminated to some extent by dissolved iron. Upon the distillation of the oleoresin the iron remains in the rosin. The presence of 0.1% iron will usually darken the rosin six or more grades. This iron is not removed by any of the methods of refining oleoresin now in use.

Crude oleoresin usually contains a considerable amount of chips, trash and other material insoluble in the oleoresin. I prefer to remove such material by filtration, or screening before removing dissolved iron.

My invention consists of a method of removing this iron, as well as other acid-soluble contaminating material from the oleoresin by washing the oleoresin with an acid solution. The acid employed may be, for example, hydrochloric, sulfuric, nitric, phosphoric, or acetic, or a mixture of any of these acids. The oleoresin is separated from the acid washing solution, washed with water and distilled in the usual manner.

One of the methods used to improve the color of rosin contaminated with iron is to add oxalic acid crystals to the still during the process of distillation, or to the hot rosin after the turpentine has been distilled. Such a process merely changes the color of the iron-contaminated rosin and does not remove the iron from the rosin. Thus, a rosin treated in this manner may have the color of WG and be graded as such, while it contains the impurities normally present in a rosin of grade H. The products made from such a rosin will be such as would be expected from grade H rosin; that is, the rosin producer has temporarily disguised a low grade product, so that it will sell for a higher price.

The density of crude oleoresin and water are so nearly the same that the separation of the two is quite difficult. This separation may be accomplished by decreasing the density of the oleoresin by diluting it with a solvent whose density is less than that of water, or by increasing the density of the acid solution by dissolving in it some neutral or acid salt. I prefer the former method of separation, and for a solvent I prefer to use turpentine, since such a method will involve no problem in separating the solvent used from the turpentine originally present in the oleoresin. And, I prefer to add sufficient turpentine to the oleoresin so that the turpentine content is approximately 35 to 50% of the total products obtained by distillation.

The filtered oleoresin containing the added turpentine may be allowed to settle and the water present in the original material may be drained off before washing the oleoresin with the acid solution to prevent the dilution of the acid solution by this water, or the oleoresin may be washed with acid just as it comes from the filter.

Any strength acid solution that does not damage the oleoresin may be used. I prefer an aqueous solution whose strength is between 1 normal and 2 normal. A small amount of solvent (such as alcohol or acetic acid), soluble in water and oleoresin, may be added to the acid solution to increase the efficiency of the washing operation.

As an example of a method for carrying out the refining of oleoresin in accordance with my invention, a solution of oleoresin in turpentine, which would yield 40% turpentine and 60% rosin on distillation, is run through a jet, or some mixing device, into the bottom of a tank, partially filled with a 5% aqueous solution of sulfuric acid. The temperature of the oleoresin and acid solution is maintained at approximately 70° C. After being thoroughly mixed for two or three minutes, the oleoresin and the acid solution are allowed to separate by gravity, and the oleoresin is withdrawn from the acid tank. It is then washed with water, either copiously or otherwise, to remove any entrained acid, and distilled in the usual manner.

I do not limit myself to any particular apparatus, temperature, methods of mixing, dilutions of oleoresin, or concentrations of acid in carrying out my process, it being obvious that oleoresin varies in quality, composition and contaminating materials, which will necessitate various modifications in its treatment and handling.

Having thus described my invention, what I claim for Letters Patent is:

1. The method of refining crude oleoresin containing iron compounds which comprises dissolving the oleoresin in turpentine, mixing the oleoresin solution with about a 1 to 2 normal aqueous solution of sulfuric acid at a temperature of about 70° C. until the iron compounds are dissolved out, separating and washing out the acid solution from the oleoresin solution and thereafter distilling off the turpentine.

2. The method of refining crude oleoresin containing iron compounds which comprises dissolving the oleoresin in turpentine, mixing the oleoresin solution with about a 1 to 2 normal solution of a mineral acid at a temperature of about 70° until the iron compounds are dissolved out, separating and washing out the acid solution from the oleoresin solution and thereafter distilling off the turpentine.

3. The method of refining crude oleoresin containing iron compounds which comprises dissolving the oleoresin in turpentine, mixing the oleoresin solution with about a 1 to 2 normal solution of hydrochloric acid at a temperature of about 70° C. until the iron compounds are dissolved out, separating and washing out the acid solution from the oleoresin solution and thereafter distilling off the turpentine.

4. The method of refining crude oleoresin containing iron compounds which comprises dissolving the oleoresin in turpentine, mixing the oleoresin solution with about a 1 to 2 normal solution of phosphoric acid at a temperature of about 70° C. until the iron compounds are dissolved out, separating and washing out the acid solution from the oleoresin solution and thereafter distilling off the turpentine.

RAY V. LAWRENCE.